United States Patent
Ghelfi et al.

(10) Patent No.: US 11,725,070 B2
(45) Date of Patent: Aug. 15, 2023

(54) POLYMERIZATION PROCESS FOR THE SYNTHESIS OF VINYL AROMATIC POLYMERS WITH A CONTROLLED STRUCTURE

(71) Applicant: VERSALIS S.P.A., San Donato Milanese (IT)

(72) Inventors: Franco Ghelfi, Modena (IT); Angelo Ferrando, Montova (IT); Aldo Longo, Montova (IT); Mirko Buffagni, Modena (IT)

(73) Assignee: Versalis S.P.A., San Donato Milanese (IT)

( * ) Notice: Subject to any disclaimer, the term of this patent is extended or adjusted under 35 U.S.C. 154(b) by 235 days.

(21) Appl. No.: 17/052,880

(22) PCT Filed: May 8, 2019

(86) PCT No.: PCT/IB2019/053763
§ 371 (c)(1),
(2) Date: Nov. 4, 2020

(87) PCT Pub. No.: WO2019/215626
PCT Pub. Date: Nov. 14, 2019

(65) Prior Publication Data
US 2021/0371555 A1 Dec. 2, 2021

(30) Foreign Application Priority Data
May 9, 2018 (IT) .......................... 102018000005186

(51) Int. Cl.
*C08F 112/08* (2006.01)
*C08F 12/08* (2006.01)

(52) U.S. Cl.
CPC .................. *C08F 112/08* (2013.01)

(58) Field of Classification Search
CPC ..... C08F 112/08; C08F 2438/01; C08F 12/08
See application file for complete search history.

(56) References Cited

FOREIGN PATENT DOCUMENTS

| CN | 101555306 A | 10/2009 |
|---|---|---|
| RU | 2680811 C1 | 2/2019 |
| WO | 9840415 A1 | 9/1998 |
| WO | 2012/020545 A1 | 2/2012 |

OTHER PUBLICATIONS

Indian Examination Report dated Apr. 28, 2022 from corresponding Indian Application No. 202017051943, 6 pages.
A. J. Clark, A. Comia, F. Felluga, A. Gennaro, F. Ghelfi, A. A. Isse, M. C. Menziani, F. Muniz-Miranda, F.Roncaglia, and D. Spinelli, Eur. J. Org. Chem., 30, 6734, 2014 (Abstract only).
Neumann et al.; "Atom transfer radical polymerization (ATRP) of styrene and methyl methacrylate with a,a,-dichlorotoluene as initiator; a kinetic study"; Macromol. Chem. Phys. 201, 980-984, 2000.
Matyjaszewski et al.; Diminishing catalyst concentration in atom transfer radical polymerization with reducing agents, PNAS, Oct. 17, 2006, vol. 103, No. 42, pp. 15309-15314.
International Search Report dated Aug. 23, 2019 for PCT application No. PCT/IB2018/053763.
Written Opinion dated Aug. 23, 2019 for PCT application No. PCT/IB2018/053763.
Wei Tang et al; Understanding Atom Transfer Radical Polymerization: Effect of Ligand and Initiator Structures on the Equilibrium Constants; Journal of American Chemical Society; vol. 130, No. 2; Aug. 1, 2008; pp. 10702-10713.

*Primary Examiner* — Catherine S Branch
(74) *Attorney, Agent, or Firm* — Ruggiero McAllister & McMahon LLC

(57) ABSTRACT

The present invention relates to a polymerization process for the synthesis of vinyl aromatic polymers, in which the sequence of monomers in the chain and the linear, branched soluble, or crosslinked insoluble structure, with reactive or different polarity functions, are controlled. Said process comprises the step of polymerizing vinyl aromatic monomers by means of an Atom Transfer Radical Polymerization (ATRP) reaction with an Activator ReGenerated by Electron Transfer (ARGET), the reaction being carried out at a temperature comprised between 25° C. and 110° C. in an inert gas atmosphere in the presence of a complex catalyst containing a cupric halide and a multidentate amine ligand, feeding to the reaction an organic initiator having two geminal halogens, an alkali metal (bi)carbonate, a solvent pair of an aliphatic alcohol and an acetic ester of the same aliphatic alcohol and possibly ascorbic acid, provided that no initiator is used with three or more active halogens, or polyvinyl monomers or inimers.

23 Claims, No Drawings

POLYMERIZATION PROCESS FOR THE SYNTHESIS OF VINYL AROMATIC POLYMERS WITH A CONTROLLED STRUCTURE

The present invention relates to a process for the synthesis of vinyl aromatic polymers, in which the sequence of monomers in the chain and the linear, branched soluble, or crosslinked insoluble structure, with reactive or different polarity functions, can be controlled.

The polymers thus produced can be used as such or can be used for producing block polymers, without the use of poly-functional initiators, which can generate three or more polymer chains, without the use of polyvinyl monomers or inimers used to obtain branched polymer structures, at contained costs thanks to the use of low concentrations of complex catalyst and low component costs.

The process uses an Atom Transfer Radical Polymerization (ATRP) reaction of vinyl aromatic monomers with an Activator ReGenerated by Electron Transfer (ARGET), indicated herein as ARGET-ATRP.

Said process can be applied to the synthesis of linear, branched, block and functionalized vinyl aromatic polymers to be used as such. Said process can further be applied for making compatible polymer compositions containing vinyl aromatic and other incompatible polymers, for the preparation of vinyl aromatic compositions with reactive, adhesive, flame retardant, anti-static or bactericidal functions.

A polymer with a crosslinked structure means an insoluble polymer, at the most swelling with the monomer or with a suitable solvent even if covalent chemical bonds are not identified between the chains. In the same way, polymers with a branched structure are soluble polymers that display polydispersity provided by the ratio between the weight average molecular mass (Mw) and the number average molecular mass (Mn) indicated with Mw/Mn greater than 2 and Mw determined with viscosimetric detection or Multi Angle Laser Light Scattering (MALLS) greater than 20% with respect to Mw determined with refraction index detection, even if no covalent chemical bonds are identified in the branching points between the chains. Polymers with a linear chain are polymers in which Mw determined with viscosimetric detection or Multi Angle Laser Light Scattering (MALLS) is about equal to a maximum of 20% greater than Mw determined with refraction index detection.

In the present patent application, the term (meth)acrylic means an acrylic or methacrylic compound; the term (bi)carbonate means a carbonate or bicarbonate compound.

In the present patent application, all the operating conditions included in the text must be considered as preferred conditions even if this is not specifically stated.

For the purpose of this text the term "comprise" or "include" also comprises the term "consist in" or "essentially consisting of".

For the purpose of this text the definitions of the intervals always comprise the extremes unless specified otherwise.

PRIOR ART

U.S. Pat. No. 7,893,174 describes an Atom Transfer Radical Polymerization (ATRP) with Activator ReGenerated by Electron Transfer (ARGET).

In particular, it describes a polymerization process in which copolymerizable monomers can be polymerized in the presence of a reducing agent and a polymerization means that initially comprises a catalyst with at least one transition metal and a radical initiator, in which the molar ratio between transition metal and radical initiator is less than 0.05, up to 0.01.

The catalyst further comprises a multidentate amine ligand as well as a transition metal. The reducer must be suitable for reducing the metal of the catalyst so as to make it active in reversibly extracting a halogen from the initiator or from the radical chain in the dormant form and forming a radical able to propagate by adding monomer. The reducing agent can be either inorganic or organic, e.g. ascorbic acid, stannous compounds, reducing sugars, mercaptans, alcohols. The ARGET-ATRP reaction can be carried out in the presence of solvent and a base. An excess of multidentate amine ligand with respect to the metal of the catalyst increases the reaction speed. In the absence of reducing agent, to obtain linear polymers mono- and di-halogenated initiators can be used and to produce branched polymers tri- and poly-halogenated initiators, multivinyl comonomers and inimers. In the examples with vinyl aromatic monomers like styrene, the reaction is carried out at temperatures of 110° C.

U.S. Pat. No. 8,933,183 describes an ARGET-ATRP process applied to monomers derived from (meth)acrylic acid that uses a copper based complex catalyst. Said catalyst contains 5 ppm to 30 ppm by weight of copper atoms, and a molar quantity less than or equal to 7 mmol % of a multidentate amine as the ligand, wherein said amine is present in molar quantities less than or equal to 150% by moles with respect to the total content of copper atoms.

The reactant system further contains at least one reducing agent and at least one base. The reducing agents include alcohols, aldehydes, phenols and organic acids such as ascorbic acid and salts and esters of ascorbic acid. The base is a mono- or poly-amine organic compound or an inorganic compound of lithium, sodium and calcium, including sodium methoxide, potassium ethoxide, hydroxides, carbonates, bicarbonates, phosphates, acetates, oxalates, ascorbates. If ascorbic acid is being used as a reducing agent, the ARGET-ATRP process for the controlled polymerization of (meth)acrylic monomers can be carried out in a solvent suitable to solubilize ascorbic acid, such as organic or aqueous mixtures that include methanol, ethanol, propanol, dimethylsulfoxide, dimethylformamide, dimethylacetamide, N-methylpyrrolidone.

The resulting (meth)acrylic polymer has a distribution of molecular weights that ranges from 1.1 to 1.8.

The ATRP synthesis process is suitable for the production of polymers with a controlled, linear, branched structure, with reactive functions. The control of the polymerization reaction is regulated by the balance between non-active (dormant) and active (living) forms of the polymer chain, which depends in turn on the oxide-reductive balance of the catalytic system used with a multidentate amine ligand. Said ligand is selected based on the monomer and on the halogen present in the reaction system as described in Journal of The American Chemical Society (2008 130(32) 10702-10713). The initiator is selected so that it is more reactive than the polymer chain in the non-active form so that the initiation of the polymer chains is promoted with respect to their propagation. In the synthesis carried out with ATRP process, the vinyl aromatic monomers are less reactive than the (meth)acrylic monomers and require higher temperatures or more effective ligands in shifting the reaction balance from the dormant to the active form. With vinyl aromatic monomers, in which over 80% of the termination of the radical chains takes place by coupling, the use of difunctional initiators, i.e. with two halogens per molecule, allows the control of the reaction to be maintained also in the case of termination by coupling of two radical chains in the active form, as the chain produced maintains two halogenated terminals although having a length provided by the sum of the two reacting chains. The linear or branched structure cannot be modified by changing the temperature or concentration of the reactants, but only by inserting, or not, polyfunctional initiators with at least three functions, or polyvinyl monomers with at least two vinyl groups per molecule, or vinyl monomers with halogen groups that can act both as monomers in the propagation of the polymer chain and as initiators of new chains (also known as inimers).

The ARGET-ATRP known up to now makes the ATRP process cheaper, by reducing up to over twenty times the quantity of catalyst containing transition metal or multidentate amine ligand, necessary for carrying out the reaction without modifying the variety of polymer structures that can be obtained with respect to the ATRP process.

SUMMARY

The Applicant has found a process for the synthesis of vinyl aromatic polymers in which the sequence of monomers in chain and the linear, branched soluble or crosslinked insoluble, structure, with reactive functions or different polarities, can be controlled, which process uses an Atom Transfer Radical Polymerization (ATRP) reaction of vinyl aromatic monomers with Activator ReGenerated by Electron Transfer (ARGET), in the present text indicated as ARGET-ATRP.

The structure (linear, branched or crosslinked) of the polymers produced can be obtained without adding branching or crosslinking substances, polyfunctional initiators with at least three functions, polyvinyl monomers or inimers that can provide branched polymer structures, but simply by regulating the reaction temperature and/or the relative quantities of components of the reaction mixture, in particular reactants and solvent pair.

In this way, with all the same components of the reactant system, at 100° C. it is possible to obtain a linear polymer and at 70° C. a crosslinked polymer.

Therefore, the subject matter of the present invention is a polymerization process for the synthesis of vinyl aromatic polymers, in which the sequence of monomers in the chain and the linear, branched soluble, or crosslinked insoluble structure, with reactive or different polarity functions, are controlled; said process comprises the step of polymerizing vinyl aromatic monomers by means of an Atom Transfer Radical Polymerization (ATRP) reaction with an Activator ReGenerated by Electron Transfer (ARGET), the reaction being carried out at a temperature comprised between 25° C. and 110° C. in an inert gas atmosphere in the presence of a complex catalyst containing a cupric halide and a multidentate amine ligand, feeding to the reaction an organic initiator having two geminal halogens, an alkali metal (bi)carbonate, a solvent pair of an aliphatic alcohol and an acetic ester of the same aliphatic alcohol and possibly ascorbic acid, provided that no initiator is used with three or more active halogens, or polyvinyl monomers or inimers.

The advantage of the process according to the present patent application consists of the possibility to produce vinyl aromatic polymers in which the sequence of monomers in chain and the linear, branched soluble, or crosslinked insoluble structure, with reactive functions or different polarities, are controlled, which can be used for producing block polymers, without the use of polyfunctional initiators with 3 or more functions, of polyvinyl monomers and inimers used to obtain branched polymer structures, at contained costs due to the low complex catalyst concentration and the low cost of the other necessary components.

The process allows the structure of the vinyl aromatic polymer to be controlled in a versatile way by changing the temperature and the composition of the reaction mixture, without introducing expensive reactants.

DETAILED DESCRIPTION

The process according to the present patent application is now described in detail.

The vinyl aromatic monomers are subject to an Atom Transfer Radical Polymerization (ATRP) reaction with an Activator ReGenerated by Electron Transfer (ARGET). The reaction is carried out in an inert gas atmosphere at a temperature comprised between 25° C. and 110° C. An organic initiator is fed to the reaction having two geminal halogens, an alkali metal (bi)carbonate, a solvent pair of an aliphatic alcohol and an acetic ester of the same aliphatic alcohol and possibly ascorbic acid, provided that initiators with three or more active halogens are not used, or polyvinyl monomers or inimers.

Through such process vinyl aromatic polymers are produced in which the sequence of monomers in chain and the linear, branched soluble, or crosslinked insoluble structure, with reactive functions or different polarity, are obtained by controlling the temperature and concentration of the compounds that form the reaction mixture.

The synthesis of vinyl aromatic polymers with a linear structure through ARGET-ATRP according to the process of the present invention if the reaction mixture contains at least one vinyl aromatic monomer, at least one organic initiator with two geminal halogens, at least one catalyst containing a cupric halide and a multidentate amine ligand, alkali metal (bi-)carbonate and a solvent pair of an aliphatic alcohol and of an acetic ester of the same aliphatic alcohol. The reaction can be carried out in an inert gas atmosphere at a temperature preferably comprised between 70° C. and 110° C., more preferably comprised between 80° C. and 110° C., even more preferably comprised between 90° C. and 110° C., even more preferably between 90° C. and 100° C.

If, in the reaction mixture, as well as the components listed for the synthesis of vinyl aromatic polymers with a linear structure, ascorbic acid is present at temperatures less than or equal to 100° C. (soluble) branched polymer structures can be obtained and at temperatures comprised between 60° C. and 70° C., if the solvent pair is comprised of ethyl acetate and ethanol, (insoluble) crosslinked polymer structures can be obtained. With organic initiators with only one halogen, instead of two geminal halogens, although in the presence of all the other components of the reaction mixture listed for the formation of branched or crosslinked polymer, at temperatures comprised between 25° C. and 110° C., only polymers with a linear structure are obtained. If an alkali metal (bi)carbonate is not present the polymerization does not take place even in the presence of all the other components of the reaction mixture listed for the formation of linear, branched or crosslinked polymer, at temperatures comprised between 25° C. and 110° C.

The vinyl aromatic monomers that can be used in the process according to the present patent application have general formula (I):

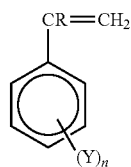

where R is a hydrogen or a methyl group, n is zero or an integer from 1 to 3, Y is a halogen selected from chlorine or bromine, or Y is an alkyl group or an alkoxy group having 1 to 3 carbon atoms.

The preferred vinyl aromatic monomers having formula (I) are selected from styrene, α-methyl-styrene, vinyltoluene isomers, ethylstyrene isomers, propylstyrene isomers, chlorostyrene isomers, bromostyrene isomers, methoxystyrene isomers, acetoxystyrene isomers, and mixtures thereof. More preferably said vinyl aromatic monomers can be selected from styrene and mixtures of styrene and α-methyl-styrene.

The initiators with two geminal halogens that can be used in the process described and claimed in the present patent application have formula $X_2$—C—(R1)R2 where X is a halogen selected among F, Cl, Br or I; R1 is H in the event in which R2 is an aromatic group, preferably selected from phenyl or substituted phenyl, or R1 is an aliphatic alkyl group with one to 20 carbon atoms, preferably 2 to 15 carbon atoms, more preferably 2 to 10 carbon atoms, with a linear or branched structure if R2 is an alkyl ester comprising a carboxyl group with a linear or branched alkyl containing 1 to 30 carbon atoms, preferably 1 to 20 carbon atoms, more preferably 1 to 10 carbon atoms.

X is preferably selected from chlorine and bromine, even more preferably it is chlorine which is more suitable when protic solvents are used that have a labile hydrogen atom that can be yielded as an $H^+$ ion; protic solvents that can be used can be selected from alcohols, diols, polyols, fluoroalcohols or carboxylic acids; methanol and ethanol are more preferred.

Protic solvents are described in Journal of Polymer Science, Part A: Polymer Chemistry, 2014, 52(15), 2175-2184.

Initiators with two geminal halogens (di-halogenated) (on the same carbon atom) guarantee a greater living character, as they allow the halogen functions to be maintained as chain terminals also in the event in which the radical chains terminate prevalently by coupling in the phase in which they are active, such as in the case of vinyl aromatic polymers. To be effective, di-halogenated initiators must have both halogens with reactivity greater than or equal to the same terminal halogens of the vinyl aromatic chains propagating in the inactive form. If one of the two halogens of the initiator were more stable in the initial form with respect to the vinyl aromatic chain with the terminal halogen, the polymer chain would continue to grow and a new chain would not initiate. Non-geminal, symmetric di-functional initiators have the same reactivity and therefore if one halogen is active then the other is also active. In the geminal di-functional initiators used in the process described and claimed, the second halogen maintains reactivity greater than or equal to the first halogen that reacted and became the end of the vinyl aromatic chain originated therefrom, hence the dual function and the growth of two vinyl aromatic chains by initiator molecule is guaranteed in the ideal case of a perfectly controlled reaction, without termination reactions by disproportion and transfer that imply the removal of chain end halogens. Preferred initiators with two geminal halogens are selected from benzyl halides, (di-chloromethyl) benzene, methyl 2,2-dichlorobutanoate, ethyl 2,2-di-chloropropanoate, methyl 2,2-di-chloro-butyrate. Preferred initiators are ethyl 2,2-di-chloro-propanoate and benzyl chloride.

The solvent that can be used in the process described and claimed in the present patent application is a mixture that contains an acetic ester of an aliphatic alcohol and the aliphatic alcohol itself.

If the alcohol is present in quantities greater than the quantity of the initial monomer and however such as to make the vinyl aromatic polymer insoluble, dispersion polymerization is obtained.

Aliphatic alcohols that can be used in the process described and claimed can be selected from methanol, ethanol, propanol, iso-propanol, ter-butanol. Methanol, ethanol, propanol and iso-propanol are also reducing substances towards the oxidized form of the catalyst.

Acetic esters of aliphatic alcohols that can be used in the process described and claimed can be selected from methyl acetate, ethyl acetate and propyl acetate, iso-propyl acetate, tert-butyl acetate.

Preferred mixtures of solvent between acetic ester of an aliphatic alcohol and the aliphatic alcohol itself are selected from ethyl acetate and ethyl alcohol, methyl acetate and methanol, isopropyl acetate and iso-propanol, tert-butyl acetate and tert-butanol.

The most preferred solvent mixture also due to its high environmental compatibility may be the mixture that contains ethyl acetate and ethyl alcohol.

In the temperature range between 60° C. and 70° C., with the same volume of monomer and solvent system, for ratios between ethyl acetate and ethanol greater than or equal to 7/1 no crosslinking is observed, whereas for ratios less than or equal to 3/1 the crosslinking presents in advance as the quantity of ethanol increases.

In the temperature range between 60° C. and 70° C. it is therefore observed that when using ethyl acetate/ethanol as the solvent pair in a ratio comprised between 1/1 and 7/1, preferably between 1/1 and 3/1, crosslinked insoluble polymer is formed.

When using solvent pairs different from ethyl acetate/ ethanol, in the same temperature range, a branched but not insoluble polymer is formed.

It is further observed that as the polarity of the solvent and of the reaction mixture increases the reaction speed increases.

The complex catalyst that is used in the process described and claimed contains a cupric halide and a multidentate amine ligand. The halogen of the cupric halide is preferably the same halogen present in the initiator. The multidentate amine ligand may be present in equimolar or excess quantities of ligand up to 200% by moles with respect to the moles of cupric halide that correspond to copper gram-atoms.

The ARGET-ATRP process has the advantage of requiring much lower molar concentrations of catalyst formed from the copper salt and from the ligand with respect to the initiator initially present in the reaction mixture.

In the process according to the present patent application, molar concentrations of cupric halide are preferably used, comprised between 1/5 and 1/20, preferably comprised between 1/10 and 1/20, more preferably comprised between 1/15 and 1/20, with respect to the molar concentration of molecules of initiator. Concentrations of copper atoms expressed in gram-atoms per liter of reaction mixture less than 1/20 with respect to the molar concentration of molecules of initiator do not guarantee optimal control of the reaction, in particular for initiator quantities less than 1% by moles with respect to the vinyl aromatic monomer in the initial reaction mixture. The concentration variation of the catalyst with respect to that of the organic initiator with two geminal halogens, of the solvent system of the vinyl aromatic monomer, of the carbonate and of the reducing compound does not modify the structure of the polymer that is obtained under the same reaction conditions. If insoluble polymer is obtained with 1/5 catalyst with respect to the initiator, it is also obtained with 1/20 under all the same reaction conditions in terms of concentrations of different components, temperature and reaction time.

The halogen that is used in the cupric halide is preferably the same as that of the initiator, preferably it is selected from chlorine or bromine; chlorine is most preferred. The multidentate amine ligand, based on its structure, allows the efficacy of the catalyst to be regulated in the balance between the non-active form of the vinyl aromatic polymer chain, that terminates with a halogen atom, and the active radical form, as described in Journal of the American Chemical Society (2008 130(32) 10702-10713). A more active ligand increases the concentration of free radicals and allows a greater reaction speed to be obtained, but reduces the control of the structure as a high concentration of reactive radicals promotes both the propagation of the chains and their termination and transfer to monomer. The activity of the ligand in extracting a halogen from the initiator or from the dormant chain increases when passing from the multidentate amine 2,2'-bipyridine (bpy), to PentaMethylDiEthyleneTriAmine (PMDETA), to Tris[(2-Pyridyl)methyl]-Amine (TPMA), to 5,5,7,12,12,14-hexaMethyl-1,4,8,11-tetra-azaCyclo-tetradecane (Me6Cyclam) and, with the same initiator and monomer, bromine is more easily extractable from chlorine. An excess of molecules or moles of multidentate amine ligand with respect to the molecules or moles of copper allows the reaction speed to increase, but as the component is more expensive, in the process according to the present invention a molar ratio is used in molecules of multidentate amine ligand with respect to atoms of copper or moles of cupric halide between 1/1 and 2/1 and preferably of 1.5/1 and more preferably of 1/1.

Multidentate amines selected from 2,2'-bipyridine (bpy), PentaMethylDiEthyleneTriAmine (PMDETA), Tris[(2-Pyridyl)methyl]-Amine (TPMA) and 5,5,7,12,12,14-hexaMethyl-1,4,8,11-tetra-azaCyclo-tetradecane (Me6Cyclam) are preferred.

In the process described and claimed an alkali metal (bi)carbonate must be used without which the polymerization reaction of vinyl aromatic monomers does not take place. This compound is usually used anhydrous and dispersed in the form of powder with dimensions less than or equal to 500 micron in the reaction mixture. The (bi)carbonates of alkali metals selected from Li, Na, K, Rb, Cs, Fr, Be, Mg, Ca, Sr, Ba and Ra are preferred; those of sodium and potassium are more preferred; the most preferred as it is widespread and easy to find is that of sodium.

Reducing compounds may possibly be added to the reaction mixture at the start of or during the polymerization reaction, selected from ascorbic acid or an alkali metal salt of ascorbic acid, organic tin compounds such as tin 2-ethylhexaonoate, organic acids selected from citric acid, oxalic acid, salts and esters of ascorbic acid, organic substances selected from aldehydes or phenols, such as tert-butylcatechol (used as an antioxidant in the storage of vinyl aromatic monomers), tin(II) 2-ethylhexaonoate and tocopherol. Further reducing agents used in the process described and claimed may be alcohol present in large excess with respect to copper(II) atoms in the solvent pair acetic ester of aliphatic alcohol and aliphatic alcohol, and the multidentate amine ligand.

The reducing compounds may be present in lower molar quantities than the (bi)carbonate salt, preferably less than or equal to 1 mole of reducing agent per 2 moles of (bi)carbonate. Surprisingly, with the use of ascorbic acid in controlled quantities and reaction conditions in the ARGET-ATRP process according to the present invention, vinyl aromatic polymers can be obtained with a branched soluble, linear structure and, if the solvent pair contains ethanol, crosslinked insoluble, without using tri- or poly-functional initiators or divinyl monomers.

In the absence of anhydrous alkali metal (bi)carbonate, also in the presence of reducing agents such as ascorbic acid dissolved in the reaction mixture through alcohol, the reaction does not take place.

The controlled polymerization reaction may also be carried out with other reducing agents, but only in the presence of ascorbic acid the formation of branched soluble polymer is observed and in the temperature range between 60° C. and 70° C. insoluble polymer is formed if the solvent pair is comprised of ethyl acetate and ethanol.

In the ARGET-ATRP process of the present invention, the inorganic base comprising alkali metal (bi)carbonate is essential for the reaction to take place. Also in the presence of other reducing agents, as well as the alcohol of the solvent system, without alkali metal (bi)carbonate the polymerization of the vinyl aromatic monomer does not take place. The function of the inorganic (bi)carbonate base is that of neutralizing any acid present in the reaction mixture and shifting the balance in favor of the formation of active radical chains very effectively. Therefore, the (bi)carbonate is dosed in the minimum quantity necessary to obtain a sufficiently high reaction speed, but not such as to make the reaction uncontrolled. The (bi)carbonate is not soluble in the reaction mixture and is active on the surface therefore it is preferable to use sodium or potassium (bi)carbonate with a mean diameter less than or equal to 500 μm and preferably less than or equal to 200 μm. Due to its low cost and wide availability, the preferred basic salt is sodium carbonate.

In the initial reaction mixture of the ARGET-ATRP process, copper is fed in the oxidized form (II) and therefore the presence of at least one reducing agent is necessary for reducing the copper to the reduced form (I) and forming the initiation radicals or propagation of the radical chains.

If the reducing agent is present in the reaction mixture in lower molar quantities with respect to the copper(II) atoms the process is called AGET-ATRP and if the reducing agent is present in molar quantities greater than or equal to the copper(II) atoms, the process is called ARGET-ATRP. In the ARGET-ATRP process according to the present patent application, a reducing agent may be the alcohol present in large excess with respect to the copper(II) atoms in the solvent pair acetic ester of aliphatic alcohol and aliphatic alcohol. The multidentate amine ligand can also be a reducing agent, but given its high cost it is worth using it in minimum concentrations, in a 1 to 1 molar ratio with the copper atoms.

The polymerization reaction can be performed at a temperature comprised between 25° C. and 110° C. The polymerization reaction can be carried out at atmospheric or super-atmospheric pressure up to 20 bar on the basis of the reaction and boiling temperature of the reaction mixture in which the solvent mixture is the most volatile component.

Some application examples of the present invention are now described, with the sole purpose of non-limiting description and that represent preferred embodiments according to the present invention.

EXAMPLES

In all the examples, the polymerization reaction described and claimed is carried out at atmospheric pressure.

Components Used in the Reaction Mixture

The following substances were used in the synthesis of vinyl aromatic polymers:

vinyl aromatic monomer: styrene (St) stabilized with 10 parts per million by weight of tert-butylcatechol (TBC) in an air atmosphere (made by Versalis S.p.A.), solvent and reducing systems: ethyl acetate (AcOEt), methyl acetate (AcOMet), iso-propyl acetate (AcOiPr), ter-butyl acetate (AcOtBu), methanol (Met-OH), ethanol (Et-OH), iso-propanol (i-Pr—OH), ter-butanol (tBu-OH), di-chloromethane (Merck Sigma-Aldrich), inorganic bases: sodium (bi)carbonate anhydrous (Carlo Erba), reducing agents: ascorbic acid (AA), tert-butylcatechol (TBC), tin(II) 2-ethylhexanoate (Sn(oct)2) (Merck Sigma-Aldrich), ligands: tris(2-pyridylmethyl)amine (TPMA),N,N,N',N", N"-pentamethyldiethylenetriamine (PMDETA) (Merck Sigma-Aldrich), initiators and cupric halide: ethyl 2-bromoisobutyrate (EBiB), (di-cloromethyl)benzene (Cl2TOL), $CuCl_2$ (Merck Sigma-Aldrich), Ethyl 2,2-dichloropropanoate (DCPE), methyl 2,2-dichlorobutanoate (DCBM) and ethyl 2-chloroisobutanoate (ECiB) were synthesized as reported below.

Synthesis of DCPE.

Sodium 2,2-dichloropropionate (Merck, 90%; 100 g, 1.2 mol) and methanol (Merck Sigma-Aldrich 99.8%; 250 ml) are inserted into a two-necked 500 ml flask provided with a magnetic anchor stirrer. $H_2SO_4$ (Merck Sigma-Aldrich 96%, 40 ml) is added with a dropping funnel while stirring for about 30 minutes in an ice-water bath (T=4° C.). At the end of the reaction the white suspension stirred for another hour. The solution is separated from the solid through vacuum distillation. The solvent is removed to the rotavapor; the liquid is re-dissolved in ethanol (Merck Sigma-Aldrich, 98%, 200 ml), 2 ml of $H_2SO_4$ (Merck Sigma-Aldrich 96%) are added and it is heated in an oil bath to 78° C. for 8 hours, with magnetic stirring and refluxed. The solution is left to cool, then distilled through microdistillery equipment (SAPLT ROHR System HMS 500C 100 plates, $T_{bath}$=130° C., $T_{mantle}$=78° C., $t_{reflux}$=9", $t_{take-off}$=0.1"). The yellow oil obtained has a titer determined through spectroscopy ($^1$H-NMR) of 93%.

Synthesis of DCBM.

The synthesis of methyl 2,2-dichlorobutanoate was performed by esterification with methanol of the chloride of 2 2-dichlorobutanoic acid which was in turn synthesized as described in Synthesis 2012 44 605-609, using a cylindrical tubular reactor provided with a Liebig condenser, magnetic anchor stirrer and a screw cap provided with a perforable baffle, crossed by a teflon pipette used for transporting the reaction gas. The reaction chamber, filled with tert-butyl ammonium chloride (TBAC, 2.7 g, 9.6 mmol) and butanoyl chloride (100 ml, 0.955 mol), is heated to 100° C. while $O_2$ is insufflated into the solution (40-50 ml/min) and left to bubble. Upon reaching 100° C., the flow of $Cl_2$ is opened and added to the previous one (35-45 ml/min) keeping the temperature at 100° C. for 30 minutes, then the reaction mixture is heated by 5° C. every 30 minutes until 115° C., where it remains for over 7 hours up to 9 total reaction hours. Maintaining the flows of oxygen and chlorine, the reaction mixture is heated to 120° C. then remaining at this temperature for a total of 11 hours and 30 minutes; finally it was heated to 125° C. and such temperature was maintained up to a total of 13 hours. At the end of the reaction, the raw product is transferred into a one-necked flask, where 1-hexadecene is added to remove any residues of $Cl_2$. The reaction is repeated a second time and the raw product is distilled to separate the 2,2-dichloro butanoyl chloride (yield≈94%). The reaction intermediate is dissolved in 100 ml of methanol and then heated under reflux for 4 h. The product is vacuum distilled and analyzed through NMR (purity >99%).

Synthesis of ECiB

The following were inserted in this order into a two-necked, 500 mL flask, provided with a magnetic anchor stirrer, condenser and an acid vapor washing tower: ethyl 1-hydroxy-isobutyrate (Merck, Sigma-Adrich, 800 mL, 600 mmol), $CH_2Cl_2$ (160 mL), $SOCl_2$ (Merck, Sigma-Adrich, 60 mL, 827 mmol) and DMF (Merck, Sigma-Adrich, 0.8 mL). The solution was stirred and refluxed for 8 hours. After cooling to room temperature, $H_2O$ (100 mL) was added and it was neutralized with gradual additions of bicarbonate (copious formation of $CO_2$ is observed). The organic phase is isolated with a separator funnel and anhydrified on a column containing $Na_2CO_3$ anhydrous. The eluate of two reactions is collected in a 500 mL flask, AIBN (Merck, Sigma-Adrich, 1 g) is added and it is refluxed for 18 hours to polymerize the ethyl methacrylate, which is formed parallel to the ECiB.

Then a first distillation is performed to recover the ester from the mass of polymethacrylate (oil bath T=125° C., boiler T=85-100° C. and p=from 230 to 80 mbar). The resulting distillate is then fractioned a second time (oil bath T=120° C., boiler T=90-100° C. and p=190 mbar) so as to recover the ECiB (e.g. 90-93° C. at 190 mmHg). 119.2 g of colorless liquid are collected (yield 66%, GC purity >99.5%).

ARGET-ATRP Synthesis Equipment

To perform the ARGET-ATRP synthesis of vinyl aromatic polymers, a Schlenk reactor was used as the reaction vessel (25 mL useful reaction volume, internal diameter 2.5 cm with oval-shaped magnetic anchor stirrer 2 cm long and with diameter 1 cm), which is a piece of glass suitable for performing reactions in a controlled atmosphere (argon or nitrogen). The equipment used is provided with a threaded cap, for transporting the reactants, and a needle valve, to be connected with the gas distributor. This configuration of the Schlenk reactor is suitable for carrying out reactions under slight pressure, with solvents that have lower boiling points than the reaction temperature. The threaded cap is perforated and provided with a gasket with a teflon-coated side that can also operate as a rupture disc, if the internal pressure is excessive. For any reaction to be performed under argon or nitrogen, the solid reactants are inserted first, then the atmosphere is changed with at least three vacuum/inert gas cycles (indicatively 3 minutes' of vacuum, while for the inert gas the period is defined by the reappearance of bubbling from the mercury valve). At this point, in the relevant order, the liquid reactants can be inserted (or the solutions of solid reactants) and the solvents, either with a syringe pipette, by opening the Schlenk reactor and letting the inert gas flow freely, or with a syringe, provided with a metal needle, perforating the baffle. Once the operation has finished, the tightening of the screw cap is checked, the needle is closed well and lastly the gas distributor is excluded. Finally the Schlenk flask is immersed in the thermostatic liquid (if required). As mentioned, this particular reactor is coupled to a gas distributor, a device in which a vacuum line and an inert gas are integrated, and can alternatively be connected to a single outlet, through the activation of a tap. The vacuum pump is connected directly to the distributor, whereas the direct junction between the distributor and the inert gas cylinder is not possible. It is dispensed from the cylinder through a double-stage pressure reducer, the second of which is sufficiently fine to be able to be easily regulated, and from there it enters into a device adapted to fix the pressure of the gas in line. This is obtained through a mercury bubbler, where the height of the Hg column determines the operating pressure, after exceeding which the bubbling of the gas towards the outside begins. In this way, any problems of pressurization of the glass parts are prevented. To attenuate the pressure change (which could recall external air), in the critical step of delivery of inert gas towards the Schlenk vacuum, during acclimatization, on the upper part of the bubbler there must be a reserve volume of 1-2 liters. All the fittings of the various devices are made with PVC rubber, which guarantees low gas permeability.

General Experimental Procedure: Preparation of the Solutions of Reactants.

Preparation of the Titrated 1 mL Solution (=0.2 Mol %) of the Catalytic Complex $CuCl_2$-TPMA (in Methanol, Ethanol, Iso-Propanol or Tert-Butanol).

1. Weigh 351 mg of $CuCl_2$ in a 10 mL volumetric flask and dissolve it with alcohol, bringing it up to volume (the solution is renewed monthly).
2. Weigh 151.6 mg of TPMA in a 10 mL volumetric flask. Dissolve the ligand in 4 ml of alcohol and add 2 mL of the $CuCl_2$ solution previously prepared. Then bring up to volume with fresh alcohol. In the case of poor solubility, beat until complete dissolution.

Preparation of the Titrated 1 mL Solution (=0.2 Mol %) of the Catalytic Complex $CuCl_2$-PMDETA (in Ethanol).
1. Weigh 351 mg of $CuCl_2$ in a 10 mL volumetric flask and dissolve it with ethanol, bringing it up to volume (the solution is renewed monthly).
2. Volumetrically dose 90.5 mg (109 mL) of PMDETA in a 10 mL volumetric flask.

Dissolve the PMDETA in 4 ml of ethanol and add 2 mL of the $CuCl_2$ solution prepared previously. Then bring up to volume with fresh ethanol. In the case of poor solubility, beat until complete dissolution.

Preparation of the Titrated Solution of DCPE (in Methyl, Ethyl, Iso-Propyl, Ter-Butyl Acetate).

Volumetrically insert 400 microL of DCPE (2.76 mM) into a 10 mL volumetric flask, filled with alcohol acetate (5 mL). Bring the solution up to volume with fresh solvent.

Preparation of the Titrated Solution of CAM (in Ethyl Acetate).

140 microL of CAM (1.381 mM) were volumetrically inserted into a 10 mL volumetric flask, filled with AcOEt (5 mL). The solution was then brought up to volume with fresh solvent.

Preparation of the Titrated Solution of Sn(II) 2-Ethyl-hexanoate (in Ethyl Acetate).

Weigh 0.6220 g of 85% Sn(II) 2-ethylhexanoate in ethyl acetate (1.305 mM) into a 10 mL volumetric flask. The solution was then brought up to volume with fresh ethyl acetate. The solution is used within 72 hours, after which it needs to be re-prepared.

Preparation of the Titrated Solution of Tert-Butylcatechol (TBC) in Ethyl Acetate.

Weigh 0.2126 g of TBC (1.305 mM) into a 10 mL volumetric flask and bring up to volume with fresh ethyl acetate.

General Process for Adding Components of the Reaction Mixture into the Schlenk Reactor in 4 Stages (Example for Reaction Mixture with 3 mL of Styrene, 3 mL of Ethyl Acetate and 1 mL of Ethanol):
a) weighing the ascorbic acid (where provided) and the sodium carbonate in the weighing vessel, introducing solids into the Schlenk reactor and creating the argon atmosphere;
b) dosing the styrene (3 mL) with 5 mL graduated pipette;
c) diluting with 2 mL of AcOEt (dosing with 5 mL graduated pipette) and with 1 mL of the DCPE solution in AcOEt (dosing with 2 mL graduated pipette);
d) introducing the ethanolic solution (1 mL) of the $CuCl_2$-TPMA complex, while shaking, dosing with a 2 mL graduated pipette.

Carrying Out the Reaction and Separating the Polystyrene Produced.

The reaction mixture contained in the Schlenk is thermostated in an oil (or water) bath at the temperatures and for the times fixed with stirring at 400 rpm using a magnetic anchor stirrer. The Schlenk reactor is then cooled in air for 15 minutes and the contents thereof subsequently diluted with $CH_2Cl_2$ (typically 20 mL or more). Then the polystyrene is precipitated, dripping the dichloromethane solution into plenty of methanol (250 mL). If necessary, to facilitate the precipitation and the filtration of the polystyrene, at this point, a small quantity (2 mL circa) of HCl 10% aq. can be added (weight/V). It is left to decant for 2-3 h and filtered on a filtering funnel P4 (75 mL), previously weighed.

Methods of Determining Molecular Mass Distribution.

The molecular mass distribution of polymers soluble in THF obtained was performed through liquid gel permeation chromatography (GPC) with a refractive index (RI) detector, viscometer (VISCO) and Multi Angle Laser Light Scattering (MALLS). Polymers that with a MALLS detector display a weight average molecular mass (Mw) 20% greater with respect to the same Mw obtained with a RI detector are considered branched. The GPC equipment comprises:
Waters Alliance E2695 pump-injector module provided with a degasser,
Waters oven with pre-column and 4 Phenogel columns (Phenomenex) dimensions 300×7.8 mm, particle size 5μ, porosity 106 Å, 105 Å, 104 Å, 103 Å,
Waters 410 refraction index RI detector,
Viscotek T50A viscometer detector calibrated with Viscotek polydisperse standard, with intrinsic declared viscosity.

The experimental tests were carried out under the experimental conditions reported here:
THF solvent;
Column temperature 30° C.;
Flow 1 ml/min;
Toluene internal standard;
Injection volume 200 microliters.

The samples (polydispersed) are injected at the concentration of 1 mg/ml. The universal calibration curve is constructed by injecting 20 standard of monodispersed polystyrene, with molecular weight Mp comprised between 2170

Da and 4340000 Da, recording for every molecular weight the intrinsic viscosity and the elution volume.

The acquisition and processing of data takes place through Empower2 (Waters) software and Omnisec v.4.6.1 software (Viscotek).

The examples and tables show the formulations, the temperature (T) and the reaction time (hours), the polymerized styrene fraction with respect to the initial mass inserted (X), the number average molecular mass (Mn) measured with RI detector, Mw/Mn measured with RI detector, the linear or branched or crosslinked structure obtained, the n.d. index which indicates a measurement that is not determinable.

In all the examples, the ARGET-ATRP reactions were carried out in the Schlenk equipment with the general process described above.

Examples 1-9

Linear, branched and crosslinked polymer formation with the same formulation and different reaction temperature.

The following were introduced into the Schlenk reactor: 3 mL of styrene, 3 mL of AcOEt, 1 mL of Et-OH and the reactants in the molar proportion [St]:[DCPE]:[CuCl$_2$-TPMA]:[AA]:[Na$_2$CO$_3$]=100:1 0.06:0.2:0.5:1.5.

TABLE 1

| Example [No] | T [° C.] | t [hours] | X [%] | Mn [DA] | Mw/Mn [—] | Structure |
|---|---|---|---|---|---|---|
| 1 | 110 | 4.5 | 74 | 8300 | 1.24 | linear |
| 2 | 100 | 4.5 | 64 | 9200 | 1.34 | linear |
| 3 | 100 | 9 | 90 | 1490 | 1.50 | linear |
| 4 | 100 | 18 | 100 | 2240 | 1.87 | linear |
| 5 | 90 | 18 | 89 | 1500 | 1.54 | linear |
| 6 | 80 | 18 | 89 | 3230 | 3.14 | branched |
| 7 | 60 | 18 | n.d. | n.d. | n.d. | crosslinked |
| 8 | 43 | 18 | 45 | 2180 | 3.48 | branched |
| 9 | 25 | 18 | 24 | 7200 | 1.76 | linear |

As expected, the conversion (X) increases with the temperature (T) and the reaction time (t). From 90° C. to 110° C. linear polymers are obtained, but at 80° C. and at 43° C. branched polymer structures are obtained and at 60° C. a crosslinked polymer is obtained (gelatinous, insoluble).

Comparative Examples 10-12

In the absence or shortage of Na$_2$CO$_3$ with respect to the concentration of reducing agent, ascorbic acid, no polymer is formed.

3 mL of styrene, 3 mL of AcOEt, 1 mL of Et-OH were inserted into the Schlenk reactor carrying out the reaction at T=100° C. for t=18 hours with the formulations of Table 2:

TABLE 2

| Example [No] | [St] | [DCPE] | [CuCl$_2$-TPMA] | [AA] | [Na$_2$CO$_3$] % | X [%] |
|---|---|---|---|---|---|---|
| 10 | 100 | 1.06 | 0.2 | 0.5 | 0 | 0 |
| 11 | 100 | 1.06 | 0.2 | 0 | 0 | 0 |
| 12 | 100 | 1.06 | 0.2 | 0.5 | 0.5 | 0 |

In the Comparative example 10 all the components are present for carrying out ARGET-ATRP polymerization, such as Cu(II), multidentate amine ligand, TPMA, in molar concentration equal to that of the copper atoms, ethanol and ascorbic acid as reducing agents, but, in the absence of Na$_2$CO$_3$, the polymerization reaction does not take place. In Example 11 even with ethanol only as the reducing agent, without Na$_2$CO$_3$, the polymerization reaction does not take place. In Example 12 even with ascorbic acid as the reducing agent in molar concentration equal to that of Na$_2$CO$_3$, the polymerization reaction does not take place.

Examples 13-21

In the presence of Na$_2$CO$_3$ or NaHCO$_3$ and absence of ascorbic acid linear polymer is formed.

3 mL of styrene (in Example 21 6 mL), 3 mL of AcOEt, 1 mL of Et-OH were introduced into the Schlenk reactor with the formulations and conditions of Table 3.

TABLE 3

| Example [No] T [° C.] | [St] t [hours] | [DCPE] X [%] | [CuCl$_2$-TPMA] Mn [kDa] | [AA] Mw/Mn [—] | [Na$_2$CO$_3$] % structure |
|---|---|---|---|---|---|
| 13 | 100 | 1.06 | 0.2 | 0 | 1.5 |
| 100 | 18 | 98 | 25.5 | 2.17 | linear |
| 14 | 100 | 1.06 | 0.2 | 0 | 3.0[NaHCO$_3$] |
| 100 | 18 | 99 | 20.7 | 2.0 | linear |
| 15 | 100 | 1.06 | 0.2 | 0 | 1.5 |
| 100 | 4.5 | 62 | 7.6 | 1.31 | linear |
| 16 | 100 | 1.06 | 0.2 | 0 | 1.5 |
| 100 | 9 | 90 | 18.1 | 1.74 | linear |
| 17 | 100 | 1.06 | 0.2 | 0 | 1.5 |
| 90 | 18 | 93 | 20.4 | 1.78 | linear |
| 18 | 100 | 1.06 | 0.2 | 0 | 1.5 |
| 80 | 18 | 79 | 14.3 | 1.59 | linear |
| 19 | 100 | 1.06 | 0.2 | 0 | 1.5 |
| 60 | 18 | 50 | 6.5 | 1.33 | linear |
| 20 | 100 | 1.06 | 0.2 | 0 | 1.5 |
| 43 | 18 | 25 | 3.4 | 1.21 | linear |
| 21 | 100 6 mL | 0.53 | 0.025 | 0 | 0.25 |
| 100 | 5 | 51 | 10.2 | 1.26 | linear |

In Example 13, without ascorbic acid, in the presence of $Na_2CO_3$, the polymerization reaction takes place and, also with high styrene conversions (98%), even with Mw/Mn greater than 2, branched polymer is not obtained. In the same way, in Examples 17-20, in analogous reaction conditions to examples 5-8, but without ascorbic acid, linear polymers are obtained. In Example 21, with 0.25 moles of $Na_2CO_3$ with respect to 100 moles of styrene, a linear polymer is produced with Mn equal to the theoretical one, which would be obtained with ideal "controlled-living" polymerization in which a molecule of initiator initiates two polymer chains.

Examples 22-24

With different reducing agents from ascorbic acid, in the presence of $Na_2CO_3$, branched or crosslinked polymers are not obtained.

3 mL of styrene, 3 mL of AcOEt, 1 mL of Et-OH were inserted into the Schlenk reactor carrying out the reaction at T=70° C. for t=18 hours with the formulations and conditions of Table 4.

TABLE 4

| Example [No] T[° C.] | [St] t [hours] | [DCPE] X [%] | [$CuCl_2$-TPMA] % mol Mn [kDa] | [Rid] Mw/Mn [—] | [$Na_2CO_3$] % structure |
| --- | --- | --- | --- | --- | --- |
| 22 | 100 | 1.06 | 0.05 | [AA] 0.5 | 1.5 |
| 70 | 18 | n.d. | n.d. | n.d. | crosslinked |
| 23 | 100 | 1.06 | 0.05 | [Sn(oct)2] 0.5 | 1.5 |
| 70 | 18 | 65 | 12.6 | 2.32 | linear |
| 24 | 100 | 1.06 | 0.05 | [TBC] 0.5 | 1.5 |
| 70 | 18 | 44 | 6.0 | 1.43 | linear |

In example 22 with molar concentration of the catalyst $CuCl_2$-TPMA equal to 0.05% with respect to styrene, with ascorbic acid reducing agent a crosslinked polymer would be obtained, whereas in examples 23 and 24 with tin(II) 2-ethylhexanoate and tert-butylcatechol, in the place of ascorbic acid, linear polymers are obtained.

Examples 25-29 and Comparative Examples 30-32

Formation of branched polymer with geminal difunctional initiators DCPE, Cl2TOL and DCBM and linear with monofunctional initiators CEB, EBiB, ECiB 3 mL of styrene, 3 mL of AcOEt, 1 mL of Et-OH were inserted into the Schlenk reactor carrying out the reaction at temperature T° C. for time t hours with the formulations and conditions of Table 5.

TABLE 5

| Example [No] T[° C.] | [St] t [hours] | [Init.] X [%] | [$CuCl_2$-TPMA] % mol Mn [kDa] | [AA] Mw/Mn [—] | [$Na_2CO_3$] % structure |
| --- | --- | --- | --- | --- | --- |
| 25 | 100 | DCPE 0.53 | 0.05 | 0.5 | 1.5 |
| 100 | 4.5 | 53 | 49.0 | 3.69 | branched |
| 26 | 100 | DCBM 0.55 | 0.05 | 0.5 | 1.5 |
| 100 | 4.5 | 54 | 45.6 | 3.91 | branched |
| 27 | 100 | CI2TOL 0.52 | 0.05 | 0.5 | 1.5 |
| 100 | 4.5 | 65 | 57.0 | 3.57 | branched |
| 28 | 100 | DCPE 0.53 | 0.05 | 0.5 | 1.5 |
| 100 | 9.0 | 57 | 56.7 | 4.22 | branched |
| 29 | 100 | DCBM 0.55 | 0.05 | 0.5 | 1.5 |
| 100 | 9.0 | 60 | 52.9 | 4.15 | branched |
| 30 | 100 | ClEB 1.14 | 0.05 | 0.5 | 1.5 |
| 100 | 4.5 | 56 | 9.3 | 2.03 | linear |
| 31 | 100 | EBiB 1.14 | [CuBr2] 0.05 | 0.5 | 1.5 |
| 100 | 4.5 | 45 | 12.8 | 2.10 | linear |
| 32 | 100 | ECiB 2.08 | 0.05 | 0.5 | 1.5 |
| 70 | 18 | 66 | 7.9 | 2.38 | linear |

In examples 25 to 29 with geminal dichlorinated initiators, branched polymers are obtained, whereas in examples 30 to 32 with monohalogenated initiators, with the other conditions the same, linear polymers are obtained.

Examples 33-34

Use of PMDETA ligand instead of TPMA in the conditions of Examples 2 and 15. 3 mL of styrene, 3 mL of AcOEt, 1 mL of Et-OH and the other reactants in the proportions and with the conditions listed in Table 6 were inserted into the Schlenk reactor.

TABLE 6

| Example [No] | [St] | [DCPE] | [CuCl$_2$-PMDETA] | | |
|---|---|---|---|---|---|
| T[° C.] | t [hours] | X [%] | % mol | [AA] | [Na$_2$CO$_3$] % |
| 33 | 100 | 1.06 | 0.2 | 0.5 | 1.5 |
| 100 | 4.5 | 13 | | | |
| 34 | 100 | 1.06 | 0.2 | 0.5 | 1.5 |
| 100 | 4.5 | 17 | | | |

The ligand PMDETA is less effective than TPMA in the formation of the active polymer species and the conversions are lower with the same other reaction conditions.

Examples 35-40

With 3 mL of styrene and with solvent mixtures different from AcOEt/Et-OH, in the same quantities by volume (3 mL/1 mL), in the conditions of examples 2 and 15 very different results are obtained (Example 2: [St]:[DCPE]:[CuCl$_2$-TPMA]:[AA]:[Na$_2$CO$_3$]=100:1.06:0.2:0.5:1.5, T=100° C., t=4.5 hours, Example 15: [St]:[DCPE]:[CuCl$_2$-TPMA]:[AA]:[Na$_2$CO$_3$]=100:1.06:0.2:0:1.5, T=100° C., t=4.5 hours).

Solvents and reactants in the quantities and reaction conditions reported in Table 7 were introduced into the Schlenk reactor.

With AA and the solvent pair AcOMet/Met-OH, in example 35 a polymer is obtained with a similar yield and Mw/Mn less than in Example 2 with AcOEt/Et-OH. Whereas with the solvent pairs AcOi-Pr/i-Pr—OH and AcOt-Bu/t-Bu-OH, in examples 36 and 37, polystyrene is not obtained (X=0%). In these cases, it is observed that the solvent pairs do not dissolve the catalyst Cu(II)-TPMA and AA that tend to agglomerate with the sodium carbonate forming colored residues that are deposited on the walls of the reactor. Without AA, with the solvent pair AcOMet/Met-OH, in example 38 a polymer is obtained with a yield and Mw/Mn slightly higher than Example 15 with AcOEt/Et-OH. With the solvent pair AcOi-Pr/i-Pr—OH in example 39 a distinctly higher yield is obtained and Mw/Mn slightly higher than Example 15, whereas with AcOt-Bu/t-Bu-OH, in Example 40, an analogous yield is obtained, but Mw/Mn higher with respect to example 15 with AcOEt/Et-OH.

Example 41

In the reaction and formulation conditions as in Example 7, but with solvent pair AcOMet/Met-OH, instead of AcOEt/Et-OH, insoluble polymer is not obtained, but a highly branched polymer with high Mw/Mn.

The following were inserted into the Schlenk reactor: 3 mL of styrene and AcOMet/Met-OH 3 mL/1 mL, with concentration ratios between the reactants reported below [St]:[DCPE]:[CuCl$_2$-TPMA]: [AA]:[Na$_2$CO$_3$]=100:1.06:0.2:0.5:1.5. Table 8 lists the results obtained.

TABLE 7

| Example [No] | | | [CuCl$_2$-TPMA] | | | |
|---|---|---|---|---|---|---|
| solvent | [St] | [DOPE] | % mol | [AA] | [Na$_2$CO$_3$] % | |
| T[° C.] | t [hours] | X [%] | Mn [kDa] | Mw/Mn [—] | structure | |
| 35 | 100 | 1.06 | 0.2 | 0.5 | 1.5 | |
| AcOMet/Met-OH | | | | | | |
| 100 | 4.5 | 63 | 7.5 | 1.26 | linear | |
| 36 | 100 | 1.06 | 0.2 | 0.5 | 1.5 | |
| AcOiPr/iPr-OH | | | | | | |
| 100 | 4.5 | 0 | | | | |
| 37 | 100 | 1.06 | 0.2 | 0.5 | 1.5 | |
| AcOtBu/tBu-OH | | | | | | |
| 100 | 4.5 | 0 | | | | |
| 38 | 100 | 1.06 | 0.2 | 0 | 1.5 | |
| AcOMet/Met-OH | | | | | | |
| 100 | 4.5 | 67 | 10.4 | 1.46 | linear | |
| 39 | 100 | 1.06 | 0.2 | 0 | 1.5 | |
| AcOiPr/iPr-OH | | | | | | |
| 100 | 4.5 | 79 | 9.8 | 1.40 | linear | |
| 40 | 100 | 1.06 | 0.2 | 0 | 1.5 | |
| AcOtBu/tBu-OH | | | | | | |
| 100 | 4.5 | 64 | 7.8 | 1.99 | linear | |

TABLE 8

| Example [No] T[° C.] | [St] t [hours] | [DCPE] X [%] | [CuCl$_2$-TPMA] % mol Mn [kDa] | [AA] Mw/Mn [—] | [Na$_2$CO$_3$] % structure |
|---|---|---|---|---|---|
| 41 | 100 | 1.06 | 0.2 | 0.5 | 1.5 |
| 60 | 18 | 39 | 31.5 | 7.87 | branched |

Examples 42-46

With different ratios by volume of AcOEt/Et-OH, at 60° C. crosslinked insoluble or branched soluble polymer can be obtained.

3 mL of styrene and the other reactants in the proportions and with the conditions listed below were inserted into the Schlenk reactor: [St]:[DCPE]:[CuCl$_2$-TPMA]:[AA]:[Na$_2$CO$_3$]=100:10.06:0.05:0.5:10.5, a T=60° C. The solvent mixture is comprised as defined in Table 9.

TABLE 9

| Example [No] AcOEt/Et-OH | Time [hours] X(gel)[%] | Mw [kDa] | Mw/Mn [—] | structure |
|---|---|---|---|---|
| 42 3 mL/1 mL | 13 (74) | | | crosslinked |
| 43 2 mL/2 mL | 8 (92) | | | crosslinked |
| 44 1 mL/3 mL | 5 (100) | | | crosslinked |
| 45 3.5 mL/0.5 mL | 18 | 17.4 | 2.11 | branched |
| 46 6 mL/2 mL | 18 | 34.7 | 5.80 | branched |

In Examples 42 to 44, as the Et-OH content increases, the reaction speed increases and the crosslinking is observed at lower times. In Example 45 with 0.5 mL of Et-OH and the ratio AcOEt/Et-OH 7/1 by volume there is a lower reaction speed and crosslinking is not reached (no insoluble polymer is formed) as in Example 46 by doubling the quantities of solvent, in the same AcOEt/Et-OH ratio as Example 42.

Examples 47-50

With 3 mL of styrene at 70° C. for 18 hours with different quantities of DCPE, AcOEt/Et-OH and AA/Na$_2$CO$_3$ cross-linked insoluble and linear soluble polymers are obtained.

3 mL of styrene were inserted into the Schlenk reactor carrying out the reaction at 70° C. for 18 hours and inserting the other reactants in the proportions listed in Table 10.

TABLE 10

| Example [No] T[° C.] | [St] AcOEt/Et-OH | [DOPE] X [%] | [CuCl$_2$-TPMA] % mol Mn [kDa] | [AA] Mw/Mn [—] | [Na$_2$CO$_3$] % structure |
|---|---|---|---|---|---|
| 47 100 | 100 3 mL/1 mL | 1.06 83 | 0.05 n.d. | 0.5 n.d. | 1.5 crosslinked |
| 48 100 | 100 3 mL/1 mL | 2.12 78 | 0.05 6.8 | 0.5 1.54 | 1.5 linear |
| 49 100 | 100 2 mL/2 mL | 2.12 83 | 0.05 7.9 | 0.5 1.66 | 1.5 linear |
| 50 100 | 100 3 mL/1 mL | 2.12 100 | 0.05 n.d. | 1.0 n.d. | 3.0 crosslinked |

By increasing the ratio between the initiator and ascorbic acid, [DCPE]:[AA] from 1.06:0.5 to 2.12:0.5 in Example 48 with respect to Example 47, with the same amounts of the other components, volumes of solvent mixture, temperature (70° C.) and reaction time (18 hours), no insoluble polymer is formed, but linear polymer with slightly lower conversion. The linear polymer of Example 48 is obtained with the same other concentrations, temperature and reaction time also increasing the quantity of Et-OH to 2 mL with AcOEt/Et-OH 2 mL/2 mL as in Example 49, where an increase in styrene conversion is observed at X=83%. In Example 50, bringing back the [DCPE]:[AA] ratio to 2.12:1, as in example 47 (where [DCPE]:[AA] at 1.06:0.5) insoluble polymer is obtained with complete styrene conversion.

Examples 51-53

With 3 mL of styrene, 3 mL of AcOEt, 1 mL of Et-OH, 1.06% mol DCPE, 0.5/1.5% mol/% mol of AA/Na$_2$CO$_3$ calculated on styrene, carrying out the reaction at 60° C. for 18 hours and varying the molar concentration of CuCl$_2$-TPMA from 1/5 (=0.2% molar) to 1/20 (=0.05% molar) by moles with respect to the initial initiator (DCPE) no variations occur on the type of polymer as reported in Table 11.

TABLE 11

| Example [No] | [CuCl$_2$-TPMA]/[DCPE] | structure |
|---|---|---|
| 51 | 1/5 | branched |
| 52 | 1/10 | branched |
| 53 | 1/20 | branched |

The concentration of catalyst is indifferent in the formation of insoluble polymer.

Examples 54-55

By carrying out the reaction at 60° C. for 18 hours with 3 mL of AcOEt and 1 mL of Et-OH and reducing the content of geminal difunctional initiator content DCPE by half, insoluble polymer is no longer obtained as reported in Table 12.

TABLE 12

| Example [No] T[° C.] | [St] t [hours] | [DCPE] X [%] | [CuCl$_2$-TPMA] Mn [kDa] | [AA] Mw/Mn [—] | [Na$_2$CO$_3$] structure |
|---|---|---|---|---|---|
| 54 | 3 mL 100 | 0.53 | 0.05 | 0.5 | 1.5 |
| 60 | 18 | 32 | 44.9 | 9.11 | branched |
| 55 | 6 mL 100 | 0.53 | 0,025 | 0.25 | 0.75 |
| 60 | 18 | 69 | 52.1 | 3.22 | branched |

In Example 54, by halving the quantity of DCPE initiator with respect to Example 53, highly branched, but not insoluble polymer, is obtained. In Example 55, by doubling the quantity of styrene with respect to Example 53, branched, soluble polymer is obtained again, but the solution is less viscous than Example 54.

Examples 56-59

By carrying out the reaction at 60° C., for 18 hours, with 3 mL of styrene, 3 mL of AcOEt and 1 mL di Et-OH, 1.06% mol of DCPE initiator and 0.05% mol of CuCl$_2$-TPMA catalyst with respect to [St], reducing the content of AA or of Na$_2$CO$_3$ or both, with respect to AA/Na$_2$CO$_3$ 0.5/1.5% mol/% mol calculated on [St] of Example 53, insoluble polymer is no longer obtained as reported in Table 13.

TABLE 13

| Example [No] | [AA], [Na$_2$CO$_3$] % mol on [St] | X [%] | Mn [kDa] | Mw/Mn [—] | structure |
|---|---|---|---|---|---|
| 56 | 0.25, 0.75 | 52 | 9.1 | 1.47 | linear |
| 57 | 0.25, 1.5 | 53 | 11.1 | 1.61 | linear |
| 58 | 0.75, 1.5 | n.d. | n.d. | n.d. | crosslinked |
| 59 | 0.5, 1.0 | 58 | 26.1 | 3.39 | branched |

With the same other conditions, in Example 53, with 0.5% mol of AA and 1.5% mol of Na$_2$CO$_3$, with respect to [St], insoluble polymer was obtained. Also in Example 58, by increasing AA to 0.75% mol with respect to [St] insoluble polymer is obtained. In Example 59, by reducing Na$_2$CO$_3$ to 1.0% mol with respect to [St] branched polymer is obtained and in Examples 56 and 57 by reducing AA/Na$_2$CO$_3$ to 0.25/0.75 and 0.25/1.5 linear polymer is obtained.

Comparative Example 60

In Example 42, by carrying out the reaction at 60° C., for 13 hours, with 3 mL of styrene (26.1 mmol), 3 mL of AcOEt and 1 mL of Et-OH, 1.06% mol of DCPE initiator, 0.05% mol of CuCl$_2$-TPMA catalyst and AA/Na$_2$CO$_3$ content 0.5/1.5% mol/% mol with respect to [St], insoluble (crosslinked) polymer was obtained with X (styrene conversion) of about 74%. Under the same reaction and formulation conditions (reaction time 15 hours, instead of 13 hours) by substituting 3.25 mL of ethyl acrylate (EA, 26.1 mmol) with the 3 mL of styrene, linear polymer is obtained as reported in Table 14.

TABLE 14

| Example [No] T[° C.] | [EA] t [hours] | [DCPE] X [%] | [CuCl$_2$-TPMA] Mn [kDa] | [AA] Mw/Mn [—] | [Na$_2$CO$_3$] structure |
|---|---|---|---|---|---|
| 60 | 100 | 1.06 | 0.05 | 0.5 | 1.5 |
| 60 | 15 | 96 | 20.4 | 1.52 | linear |

The invention claimed is:

1. Polymerization process for the synthesis of vinyl aromatic polymers, in which the sequence of monomers in the chain and the linear, branched soluble, or crosslinked insoluble structure, with reactive or different polarity functions, are controlled; which comprises the step of polymerizing vinyl aromatic monomers by means of an Atom Transfer Radical Polymerization (ATRP) reaction with an Activator ReGenerated by Electron Transfer (ARGET), the reaction being carried out at a temperature comprised between 25° C. and 110° C. in an inert gas atmosphere in the presence of a complex catalyst containing a cupric halide and a multidentate amine ligand, feeding to the reaction an organic initiator having two geminal halogens, an alkali metal (bi)carbonate, a solvent pair of an aliphatic alcohol and an acetic ester of the same aliphatic alcohol and optionally ascorbic acid, provided that no initiator is used with three or more active halogens, or polyvinyl monomers or inimers.

2. Process according to claim 1, wherein if the ascorbic acid is present at temperatures less than or equal to 100° C., soluble branched polymer structures are obtained.

3. Process according to claim 1, wherein the vinyl aromatic monomers have the general formula (I):

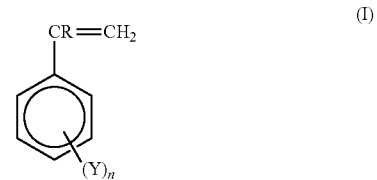

where R is a hydrogen or a methyl group, n is zero or an integer from 1 to 3, Y is a halogen selected from chlorine or bromine, or Y is an alkyl group or an alkoxy group having from 1 to 3 carbon atoms.

4. Process according to claim 3, wherein the vinyl aromatic monomers are selected from styrene, α-methyl-styrene, vinyltoluene isomers, ethylstyrene isomers, propylstyrene isomers, chlorostyrene isomers, bromostyrene isomers, methoxystyrene isomers, acetoxystyrene isomers, and mixtures thereof.

5. Process according to claim 4, wherein the vinyl aromatic monomers are selected from styrene and a styrene and α-methyl-styrene mixtures.

6. Process according to claim 1, wherein the organic initiator with two geminal halogens has the formula $X_2$—C—(R1)R2 wherein X is a halogen selected from the group consisting of F, Cl, Br and I; R2 is an aromatic group or an alkyl ester consisting of a carboxylic group with a linear or branched alkyl containing 1 to 30 carbon atoms, wherein R1 is H if R2 is an aromatic group, and wherein R1 is an aliphatic alkyl group with one to 20 carbon atoms with linear or branched structure if R2 is an alkyl ester consisting of a carboxylic group with a linear or branched alkyl containing 1 to 30 carbon atoms.

7. Process according to claim 6, wherein X is selected from chlorine and bromine.

8. Process according to claim 7, wherein the initiators with two geminal halogens are selected from the group consisting of benzyl halides, (di-chloromethyl) benzene, methyl 2,2-dichlorobutanoate, ethyl 2,2-di-chloro-propanoate, and methyl 2,2-di-chloro-butyrate.

9. Process according to claim 1, in which the solvent pair is a mixture that contains an acetic ester of an aliphatic alcohol and the aliphatic alcohol itself.

10. Process according to claim 9, wherein the aliphatic alcohol is selected from the group consisting of methanol, ethanol, propanol, iso-propanol, and tert-butanol.

11. Process according to claim 10, wherein the acetic ester of the aliphatic alcohol is selected from the group consisting of methyl acetate, ethyl acetate, propyl acetate, isopropyl acetate, and tert-butyl acetate.

12. Process according to claim 9, wherein the mixture is a solvent pair selected from the group consisting of ethyl acetate and ethyl alcohol, methyl acetate and methanol, isopropyl acetate and iso-propanol, and tert-butyl acetate and tert-butanol.

13. Process according to claim 12, wherein the solvent pair is a mixture that contains ethyl acetate and ethyl alcohol.

14. Process according to claim 13, wherein if the polymerization reaction is carried out at temperatures ranging from 60° C. to 70° C., and the solvent pair is the mixture of ethyl acetate and ethyl alcohol, insoluble crosslinked polymer structures are obtained.

15. Process according to claim 1, wherein the multidentate amine ligand is present in equimolar amount or in excess of ligand up to 200% by moles with respect to the cupric halide moles.

16. Process according to claim 1, wherein the cupric halide concentrations are comprised between 1/5 and 1/20 with respect to the molar concentration of initiator molecules.

17. Process according to claim 1, wherein the molar ratio in multidentate amine ligand molecules with respect to copper atoms or cupric halide moles varies between 1/1 and 2/1.

18. Process according to claim 1, wherein the halogen in the cupric halide is selected from the group consisting of chlorine and bromine.

19. Process according to claim 1, wherein the alkali metal of the (bi)carbonate is selected from the group consisting of Li, Na, K, Rb, and Cs.

20. Process according to claim 1, wherein at the beginning or during the polymerization reaction, reducing compounds are added selected from the group consisting of ascorbic acid, an alkali metal salt of ascorbic acid, organic tin compounds, organic acids, salts, esters and esters of ascorbic acid, aldehydes or phenols, tin(II) 2-ethylhexanoate, tocopherol, aliphatic alcohol, and the multidentate amine ligand.

21. Process according to claim 20, wherein the reducing agents are selected from the group consisting of tin 2-ethylhexanoate, citric acid, oxalic acid, and tert-butylcatechol.

22. Process according to claim 20, wherein the reducing compounds are present in molar quantities lower than the (bi)carbonate salt.

23. Process according to claim 7, wherein the initiators with two geminal halogens are selected from the group consisting of ethyl 2,2-di-chloro-propanoate and di-chloromethyl benzene.

* * * * *